US012655067B2

(12) United States Patent
Kim et al.

(10) Patent No.: US 12,655,067 B2
(45) Date of Patent: *Jun. 16, 2026

(54) HIGH PERMITTIVITY ANTIFERROELECTRIC AND MANUFACTURING METHOD THEREOF

(71) Applicants: HYUNDAI MOTOR COMPANY, Seoul (KR); KIA CORPORATION, Seoul (KR); KOREA INSTITUTE OF CERAMIC ENGINEERING AND TECHNOLOGY, Jinju-si (KR)

(72) Inventors: Hyung Suk Kim, Gwangmyeong-si (KR); Hyo Soon Shin, Jinju-si (KR); Dong Hun Yeo, Seoul (KR); Jeoung Sik Choi, Changwon-si (KR)

(73) Assignees: HYUNDAI MOTOR COMPANY, Seoul (KR); KIA CORPORATION, Seoul (KR); KOREA INSTITUTE OF CERAMIC ENGINEERING AND TECHNOLOGY, Jinju-si (KR)

( * ) Notice: Subject to any disclaimer, the term of this patent is extended or adjusted under 35 U.S.C. 154(b) by 709 days.

This patent is subject to a terminal disclaimer.

(21) Appl. No.: 18/082,247

(22) Filed: Dec. 15, 2022

(65) Prior Publication Data

US 2023/0303452 A1      Sep. 28, 2023

(30) Foreign Application Priority Data

Mar. 28, 2022      (KR) ........................ 10-2022-0038032

(51) Int. Cl.
| | |
|---|---|
| *C04B 35/515* | (2006.01) |
| *C04B 41/00* | (2006.01) |
| *H01G 4/008* | (2006.01) |

(52) U.S. Cl.
CPC ...... *C04B 35/5156* (2013.01); *C04B 41/0072* (2013.01); *H01G 4/008* (2013.01);
(Continued)

(58) Field of Classification Search
CPC ............ C04B 35/5156; C04B 41/0072; C04B 2235/3227; C04B 2235/3232; C04B 2235/3244; C04B 2235/3296
See application file for complete search history.

(56) References Cited

U.S. PATENT DOCUMENTS

| | | |
|---|---|---|
| 10,957,807 B2 | 3/2021 | Kotru et al. |
| 2001/0022487 A1 | 9/2001 | Takeuchi et al. |

(Continued)

FOREIGN PATENT DOCUMENTS

| | | |
|---|---|---|
| CN | 1990418 A | 7/2007 |
| CN | 104692799 A | 6/2015 |

(Continued)

OTHER PUBLICATIONS

CN-113929454-A machine translation (Year: 2022).*
(Continued)

*Primary Examiner* — Cameron K Miller
(74) *Attorney, Agent, or Firm* — Lempia Summerfield Katz LLC

(57) ABSTRACT

A high permittivity antiferroelectric composition and a manufacturing method thereof aim to provide an antiferroelectric, which has a $Pb_xLa_{1-x}([Zr_{1-y}Sn_y]_zTi_{1-z})$ composition, is sintered at low temperatures, and has a high density and a high permittivity.

7 Claims, 7 Drawing Sheets preparing a precursor mixture by mixing dielectric precursors calcining the precursor mixture manufacturing a molded product by pressurizing a calcined resultant product sintering the molded product to obtain a sintered body

(52) U.S. Cl.
CPC .................. *C04B 2235/3227* (2013.01); *C04B 2235/3232* (2013.01); *C04B 2235/3244* (2013.01); *C04B 2235/3293* (2013.01); *C04B 2235/3296* (2013.01); *C04B 2235/66* (2013.01); *C04B 2235/96* (2013.01)

(56) References Cited

U.S. PATENT DOCUMENTS

| | | | |
|---|---|---|---|
| 2014/0185183 A1 | 7/2014 | Park et al. | |
| 2016/0240318 A1 | 8/2016 | Engel et al. | |
| 2024/0124363 A1* | 4/2024 | Kim ..................... | H01G 4/1227 |

FOREIGN PATENT DOCUMENTS

| | | | | |
|---|---|---|---|---|
| CN | 110526707 A | 12/2019 | | |
| CN | 113929454 A | * 1/2022 | ........... | H01G 4/1245 |
| JP | H0768753 A | 3/1995 | | |
| KR | 101452077 B1 | 10/2014 | | |

OTHER PUBLICATIONS

Meysam Sharifzadeh Mirshekarloo et al., Large strain and high energy storage density in orthorhombic perovskite (Pb0.97La0. 02)(Zr1-x-ySnxTiy)O3 antiferroelectric thin films; Appl. Phys. Lett. 97; 2010; https://doi.org/10.1063/1.3497193; 5 pp.
Yijie Chen et al., The effect of Sn4+ doping on the electrostrictive property of PLZT (9/65/35) transparent electro-optical ceramics; Ceramics International, vol. 46, Issue 5, 2020, https://doi.org/10.1016/j.ceramint.2019.11.163; 7 pp.

* cited by examiner

HIGH PERMITTIVITY ANTIFERROELECTRIC AND MANUFACTURING METHOD THEREOF

CROSS-REFERENCE TO RELATED APPLICATION

This application claims under 35 U.S.C. § 119(a) the benefit of priority to Korean Patent Application No. 10-2022-0038032 filed on Mar. 28, 2022, the entire contents of which are incorporated herein by reference.

BACKGROUND

(a) Technical Field

The present disclosure relates to a high permittivity antiferroelectric and a manufacturing method thereof, and more particularly, aims to provide an antiferroelectric, which has a $Pb_xLa_{1-x}([Zr_{1-y}Sn_y]_zTi_{1-z})$ composition, is sintered at low temperatures, and has a high density and a high permittivity.

(b) Background Art

Currently, a polypropylene film or the like as a film capacitor is used as an insulator in a direct current (DC) link capacitor in an inverter for a driving motor of an electric vehicle. However, because a polymer material has been used as an insulator, the operating temperature is low, and it is impossible to operate it at high temperatures. Further, because the film capacitor has a form in which it is disposed in the capacitor case and then covered with a molding material for heat generation, the size and weight of the entire DC link capacitor are considerable so that miniaturization and weight lightening are necessary.

Conventionally, barium titanate ($BaTiO_3$), which is a material having excellent permittivity and capacity and excellent temperature characteristics, has been used. However, the material has a disadvantage in that the permittivity decreases at high voltages.

In order to solve the above-mentioned problems, an attempt is made to replace the barium titanate ($BaTiO_3$) material, which has deteriorating permittivity as the voltage increases, with an antiferroelectric (AFE) material whose permittivity and capacitor capacity increase as it is used at high voltages.

SUMMARY

The present disclosure is to solve the above-mentioned problems. An object of the present disclosure is to provide an antiferroelectric that can be sintered at low temperature and has a high density and a high permittivity.

The objects of the present disclosure are not limited to the object mentioned above. The objects of the present disclosure should become clearer from the following description and are realized by means and combinations thereof described in the claims.

A high permittivity antiferroelectric may be represented by $Pb_xLa_{1-x}([Zr_{1-y}Sn_y]_zTi_{1-z})$ (wherein each of X, Y, and Z is number in a range of 0 to 1). In certain examples, X may be in a range of 0.86 to 0.90, Y may be in a range of 0.52 to 0.56, and Z may be in a range of 0.74 to 0.78.

The high permittivity antiferroelectric may have a density in a range of 7.5 $g/cm^3$ to 8.0 $g/cm^3$.

The high permittivity antiferroelectric may have a permittivity (c) in a range of 1100 to 1300.

The high permittivity antiferroelectric may have a breakdown voltage in a range of 8 kV/mm to 10 kV/mm.

The high permittivity antiferroelectric may have a sintering temperature in a range of 900° C. to 1,100° C.

A method for manufacturing a high permittivity antiferroelectric according to the present disclosure may include preparing a precursor mixture by mixing dielectric precursors, calcining the precursor mixture; manufacturing a molded product by pressurizing a calcined resultant product, and sintering the molded product to obtain a sintered body.

The dielectric precursors may include 50% by weight to 60% by weight of lead oxide (PbO), 15% by weight to 30% by weight of zirconium oxide ($ZrO_2$), 1% by weight to 5% by weight of titanium oxide ($TiO_2$), 8% by weight to 14% by weight of lanthanum oxide ($La_2O_5$), and 1% by weight to 16% by weight of tin oxide ($SnO_2$).

The molded product may be sintered with a sintering agent including 1% by weight to 4% by weight of zinc oxide (ZnO) and 1% by weight to 10% by weight of lead oxide (PbO).

Furthermore, a capacitor according to the present disclosure may include the high permittivity antiferroelectric and an electrode disposed on the surface of the high permittivity antiferroelectric, wherein the electrode may include copper (Cu).

According to the present disclosure, it is possible to provide an antiferroelectric that can be sintered at low temperatures.

According to the present disclosure, it is possible to provide an antiferroelectric having a high density.

According to the present disclosure, it is possible to provide an antiferroelectric having a high permittivity.

The effects of the present disclosure are not limited to the above-mentioned effects. It should be understood that the effects of the present disclosure include all effects that can be inferred from the following description.

BRIEF DESCRIPTION OF THE DRAWINGS

FIG. 6C shows a density measurement result when the Z value in the $Pb_{0.88}La_{0.12}([Zr_{0.46}Sn_{0.54}]_ZTi_{1-Z})$ composition is greater than 0.76.

DETAILED DESCRIPTION

Figure 1:
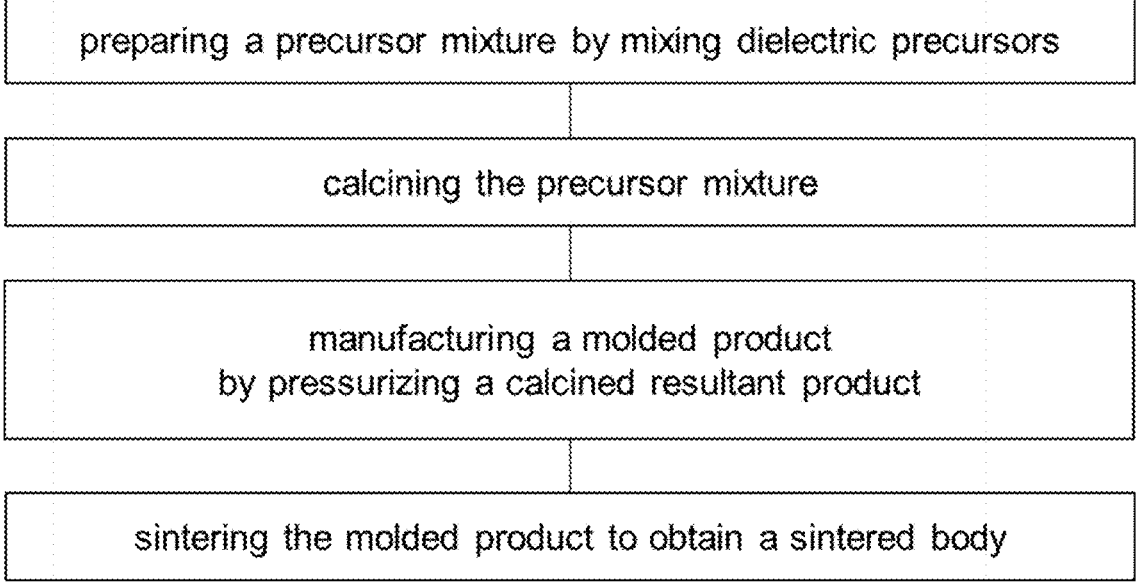
FIG. 1 shows a flowchart of a method for manufacturing a high permittivity antiferroelectric according to the present disclosure.

The above objects, other objects, features, and advantages of the present disclosure are understood through the following embodiments related to the accompanying drawings. However, the present disclosure is not limited to the embodiments described herein and may be embodied in other forms. Rather, the embodiments introduced herein are provided so that the disclosed content may become thorough and complete, and the spirit of the present disclosure may be sufficiently conveyed to those skilled in the art.

The similar reference numerals have been used for similar elements while explaining each drawing. In the accompanying drawings, the dimensions of the structures are illustrated after being enlarged than the actual dimensions for clarity of the present disclosure. Terms such as first, second, etc. may be used to describe various components, but the components should not be limited by the terms. The terms are used only for the purpose of distinguishing one component from another component. For example, a first component may be referred to as a second component, and similarly, the second component may also be referred to as the first component, without departing from the scope of rights of the present disclosure. The singular expression includes the plural expression unless the context clearly dictates otherwise.

In the present specification, terms such as "comprise", "have", etc. are intended to designate that a feature, number, act, operation, component, part, or a combination thereof described in the specification exists, but it should be understood that the terms do not preclude the possibility of the existence or addition of one or more other features, numbers, acts, operations, components, parts, or combinations thereof. Further, when a part of a layer, film, region, plate, etc. is said to be "on" another part, this includes not only the case where it is "directly on" the other part but also the case where there is another part in the middle thereof. Conversely, when a part of a layer, film, region, plate, etc. is said to be "under" another part, this includes not only the case where it is "directly under" the other part, but also the case where there is another part in the middle thereof.

Unless otherwise specified, because all numbers, values, and/or expressions expressing quantities of components, reaction conditions, polymer compositions, and formulations used in the present specification are approximate values reflecting various uncertainties of the measurement that arise in obtaining these values among others in which these numbers are different, they should be understood as being modified by the term "about" in all cases. Further, when a numerical range is disclosed in this description, such a range is continuous, and includes all values from a minimum value of such a range to a maximum value including the maximum value, unless otherwise indicated. Furthermore, when such a range refers to an integer, all integers including from a minimum value to a maximum value including the maximum value are included, unless otherwise indicated.

High Permittivity Antiferroelectric

The high permittivity antiferroelectric according to the present disclosure may include a $Pb_XLa_{1-X}([Zr_{1-Y}Sn_Y]_ZTi_{1-Z})$ composition, wherein each of X, Y, and Z is a number in a range of 0 to 1.

The present disclosure may apply an antiferroelectric material whose permittivity increases as it is used at high voltages to a capacitor. Therefore, the capacitor may be used at high voltages and has a high permittivity.

The present disclosure may improve the storage energy density by substituting Sn for Zr in $Pb(La)(Zr, Ti)O_3$ (hereinafter, PLZT) composed of lead, lanthanum, zirconium, and titanium, as an antiferroelectric material.

X may be in a range of 0.86 to 0.90, and Y may be in a range of 0.52 to 0.56. In this case, when Y is less than 0.52 or more than 0.56, there may be a problem in that both density and shrinkage are reduced.

Z may be in a range of 0.74 to 0.78. At this time, when Z is less than 0.74, the permittivity increases, but there may be a problem in that the breakdown voltage is reduced. When Z exceeds 0.78, there may be a problem in that the permittivity is reduced.

Y and Z may have a ratio in a range of 1:1 to 1:1.6. At this time, when Y and Z are out of the above ratio, a desired permittivity synergistic effect may not be obtained, or there may be a problem in that the density is reduced, or the breakdown voltage is reduced.

The antiferroelectric may have a density in a range of 7.5 $g/cm^3$ to 8.0 $g/cm^3$.

The antiferroelectric may have a permittivity (c) in a range of 1100 to 1300.

The antiferroelectric may have a breakdown voltage in a range of 8 kV/mm to 10 kV/mm.

The antiferroelectric may have a sintering temperature in a range of 900° C. to 1,100° C.

While certain dielectrics may have sintering temperatures of 1,300° C. or higher, the dielectric according to the present disclosure is characterized by having a sintering temperature that is a relatively low temperature.

In conventional multilayer ceramic capacitors (MLCCs), electrodes may be made of nickel (Ni). However, in the case of the antiferroelectric according to the present disclosure, copper (Cu) is used as an electrode in order to reduce cost. The melting point of Cu is 1,085° C., and only when the sintering temperature of the antiferroelectric is lower than 1,085° C., the Cu electrode can be maintained.

Method for Manufacturing High Permittivity Antiferroelectric

FIG. 1 shows a flowchart of a method for manufacturing a high permittivity antiferroelectric according to the present disclosure. Hereinafter, the present disclosure is described in more detail with reference to the accompanying drawings.

Referring to FIG. 1, the method for manufacturing a high permittivity antiferroelectric according to the present disclosure may include preparing a precursor mixture by mixing dielectric precursors (S10), calcining the precursor mixture (S20), manufacturing a molded product by pressurizing a calcined resultant product (S30), and sintering the molded product to obtain a sintered body (S40).

The step S10 involves preparing a precursor mixture by mixing the dielectric precursors. The dielectric precursors are mixed and synthesized to provide an element capable of constituting the dielectric framework of the present disclosure, and specifically contain elements such as lead, zirconium, titanium, lanthanum, and/or tin.

The dielectric precursors may include 50% by weight to 60% by weight of lead oxide (PbO), 15% by weight to 30% by weight of zirconium oxide ($ZrO_2$), 1% by weight to 5% by weight of titanium oxide ($TiO_2$), 8% by weight to 14% by weight of lanthanum oxide ($La_2O_5$), and 1% by weight to 16% by weight of tin oxide ($SnO_2$).

At this time, if the content is out of the above range, it is impossible to obtain an antiferroelectric including lead, zirconium, titanium, lanthanum, and tin at an optimal molar ratio.

The step S20 involves calcining the precursor mixture. Specifically, the step relates to manufacturing a molded product with the precursor mixture and performing heat treatment before performing sintering.

The calcination may be performed at a temperature in a range of 700° C. to 900° C. for 2 hours to 5 hours.

After the calcination, a pulverization process may be added as necessary in order to form a powder of even particles.

The step S30 involves manufacturing a molded product by pressurizing a calcined resultant product. The calcined product may be granulated prior to molding, e.g., mixed with a binder and a solvent so as to be granulated.

The granulated calcined product may be molded into a desired shape, and for example, the molding may be performed by pressurization.

When the binder and solvent are used, a de-binder process for removing the binder and solvent may be further performed, and the de-binder process may be performed through heat treatment at a temperature in a range of 500° C. to 700° C., and the binder and solvent may be removed by the heat treatment.

The step S40 involves obtaining a sintered body by sintering the molded product. Sintering may be performed for the purpose of making the calcined product powder particles constituting the molded product adhere to each other and harden.

In order to solve this, a sintering agent is added in this step in the present disclosure, and the sintering agent is added for the purpose of lowering the sintering temperature, but also has the effect of increasing the density and shrinkage of the dielectric.

The sintering agent may include 0.01% by weight to 4% by weight of ZnO (zinc oxide) and 0.01% by weight to 10% by weight of PbO (lead oxide).

The sintering agent may include 2% by weight to 4% by weight of ZnO (zinc oxide) and 6% by weight to 10% by weight of PbO (lead oxide), based on the total amount of the antiferroelectric.

At this time, when the sintering agent includes less than 0.01% by weight of ZnO, there may be a problem in that the density is lowered. Further, when the sintering agent comprises less than 10% by weight of PbO, there may be a problem in that both of the density and shrinkage are lowered.

The step of manufacturing the sintered body may be performed at a temperature in a range of 900° C. to 1,100° C. for 2 hours to 5 hours. In certain dielectric manufacturing processes, the sintering temperature is 1,300° C. or higher, whereas the sintering of the present disclosure is characterized in that it is performed at a relatively low temperature.

Capacitor

The capacitor according to the present disclosure includes the antiferroelectric according to the present disclosure and an electrode disposed on the surface of the antiferroelectric. The electrode is characterized by containing copper (Cu).

Hereinafter, the present disclosure is described in more detail through specific Experimental Examples. However, the Experimental Examples of the present disclosure are intended to illustrate the present disclosure, and the scope of the present disclosure is not restricted or limited thereby.

Experimental Example 1: Effect when Adding Sn to PLZT

An experiment was performed to confirm the effect when substituting Pb with Sn by adding Sn to PLZT.

Figure 2A:
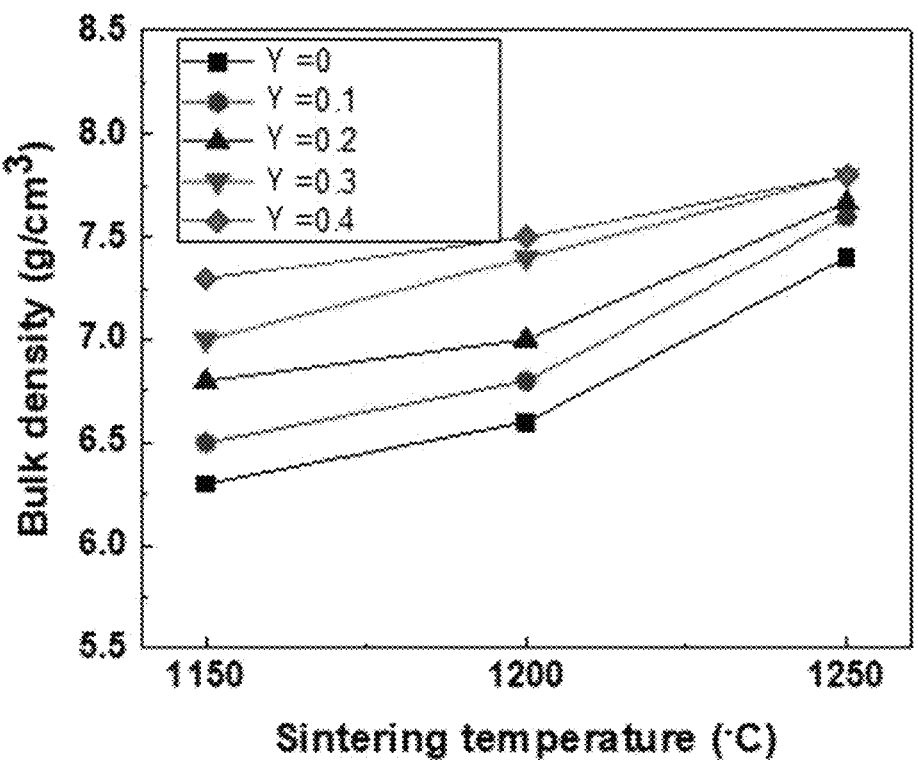
FIG. 2A shows the density depending on the sintering temperature according to the Y value in a $Pb_{0.88}La_{0.12}([Zr_{1-y}Sn_y]_{0.86}Ti_{0.14})$ composition.
Figure 2B:
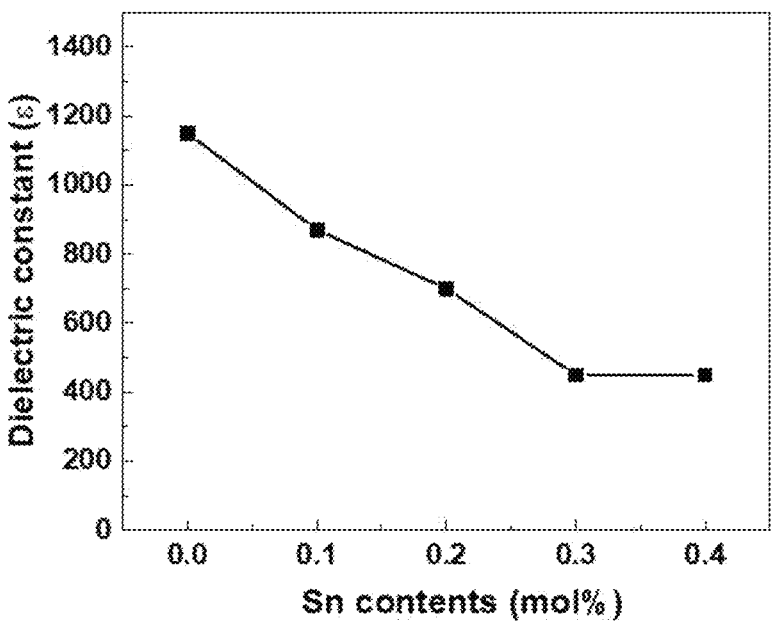
FIG. 2B shows the permittivity according to the Y value in the $Pb_{0.88}La_{0.12}([Zr_{1-y}Sn_y]_{0.86}Ti_{0.14})$ composition.
Figure 2C:
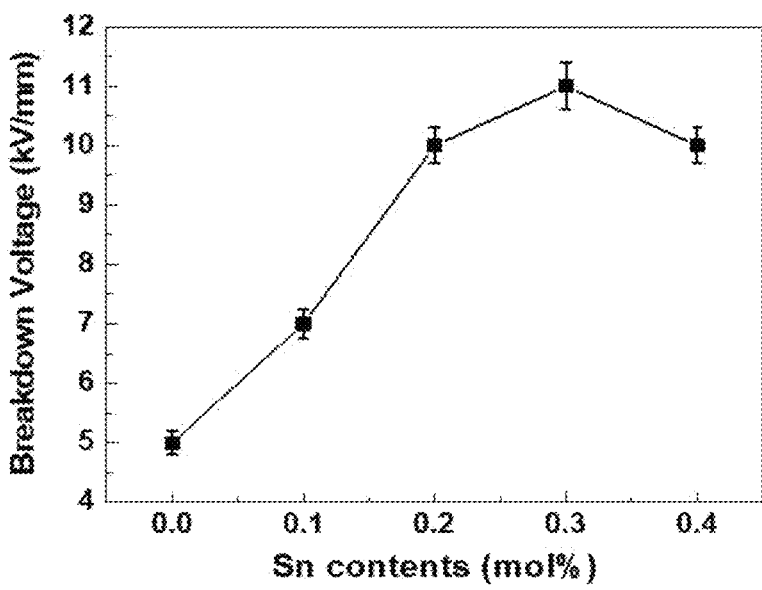
FIG. 2C shows the breakdown voltage according to the Y value in the $Pb_{0.88}La_{0.12}([Zr_{1-y}Sn_y]_{0.86}Ti_{0.14})$ composition.
Figure 2D:
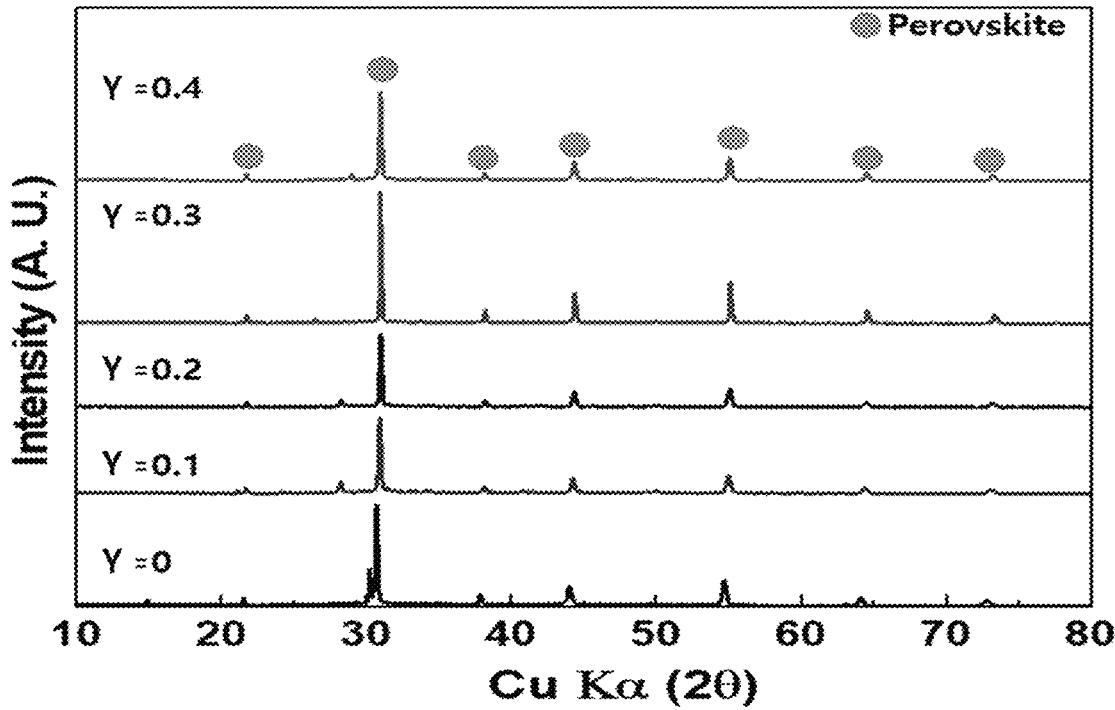
FIG. 2D shows the X-ray diffraction (XRD) according to the Y value in the $Pb_{0.88}La_{0.12}([Zr_{1-y}Sn_y]_{0.86}Ti_{0.14})$ composition.

FIG. 2A shows the density depending on the sintering temperature according to the Y value in a $Pb_{0.88}La_{0.12}$ ($[Zr_{1-y}Sn_y]_{0.86}Ti_{0.14}$) composition. FIG. 2B shows the permittivity according to the Y value in the $Pb_{0.88}La_{0.12}$ ($[Zr_{1-y}Sn_y]_{0.86}Ti_{0.14}$) composition. FIG. 2C shows the breakdown voltage according to the Y value in the $Pb_{0.88}La_{0.12}([Zr_{1-y}Sn_y]_{0.86}Ti_{0.14})$ composition. FIG. 2D shows the X-ray diffraction (XRD) according to the Y value in the $Pb_{0.88}La_{0.12}([Zr_{1-y}Sn_y]_{0.86}Ti_{0.14})$ composition.

Referring to FIGS. 2A-2C, as the Y (Sn molar ratio) value increases, the permittivity decreases, but the density and the breakdown voltage increase. Further, referring to FIG. 2D, the existing perovskite structure is maintained even when Sn is added.

Experimental Example 2: Low-Temperature Sintering Effect of ZnO

Through Experimental Example 1 above, when Y=0.3, the permittivity was low, but the density and the breakdown voltage were excellent. Accordingly, in performing the sintering in order to confirm the low-temperature sintering effect based on Y=0.3, 2% and 2.5% by weight of NiO and 2% and 2.5% by weight of ZnO were added as a sintering agent, and then the density was measured at a sintering temperature in a range of 950° C. to 1100° C.

Figure 3:
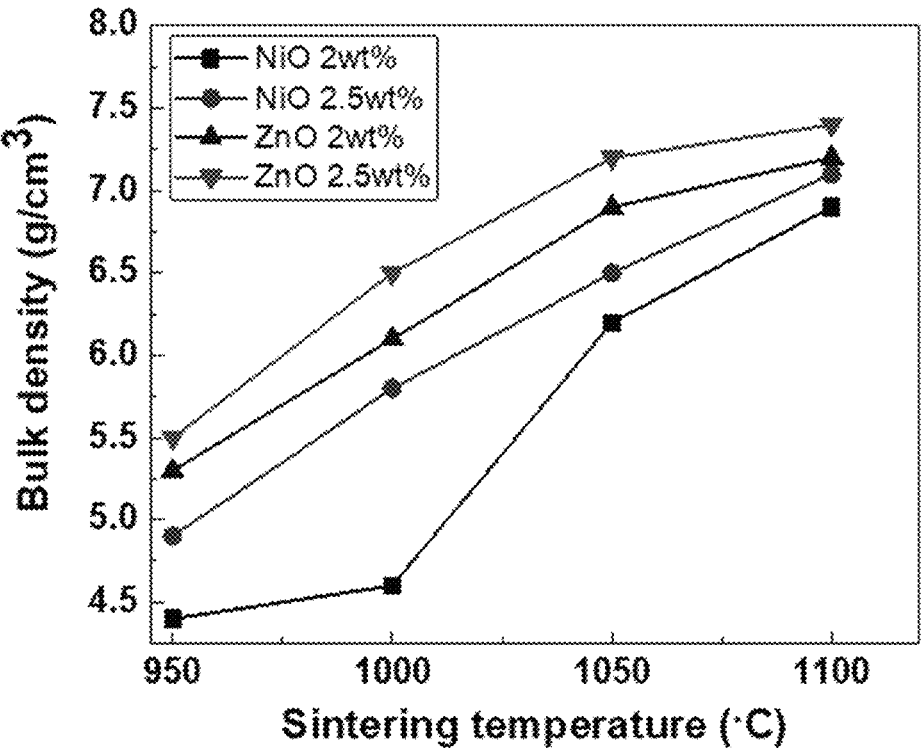
FIG. 3 shows the density depending on the sintering temperature when NiO and ZnO are added to a $Pb_{0.88}La_{0.12}([Zr_{0.7}Sn_{0.3}]_{0.86}Ti_{0.14})$ composition.

FIG. 3 shows the density depending on the sintering temperature when NiO and ZnO are added to a $Pb_{0.88}La_{0.12}$ ($[Zr_{0.7}Sn_{0.3}]_{0.86}Ti_{0.14}$) composition.

Referring to FIG. 3, ZnO has a superior low-temperature sintering effect to NiO.

Experimental Example 3: Low-Temperature Sintering Effect of ZnO+PbO

Although it was possible to confirm the low-temperature sintering effect of ZnO through Experimental Example 2 above, the expected sintering density of 7.6 g/cm³ of the present disclosure was not achieved. Therefore, as a result of continuing the experiment, ZnO alone had not a large effect at 2% by weight or more so that it was decided to additionally add another low-temperature sintering agent. Because PbO is also used as compensation for volatilization in the PLZT composition, the possibility of secondary phase compared to other additives was low so that PbO was used.

Figure 4A:
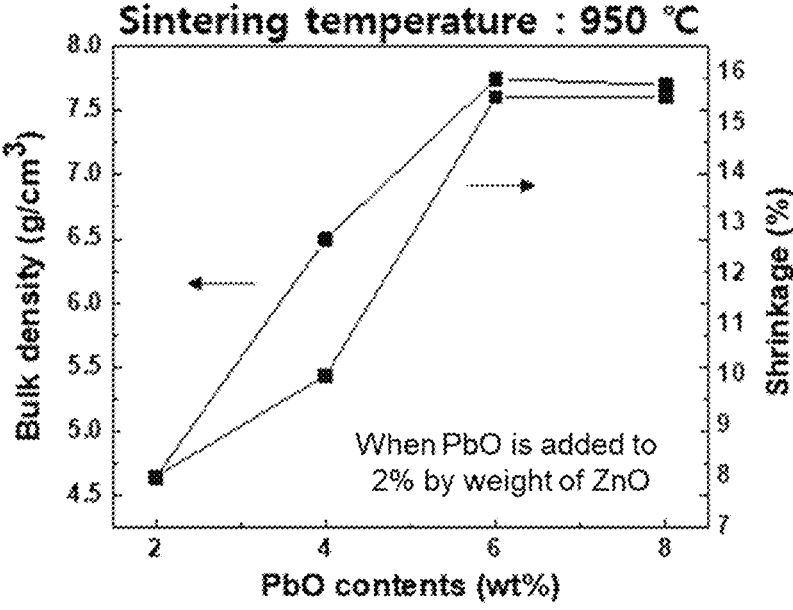
FIG. 4A shows the density and shrinkage depending on the PbO contents at a sintering temperature of 950° C.
Figure 4B:
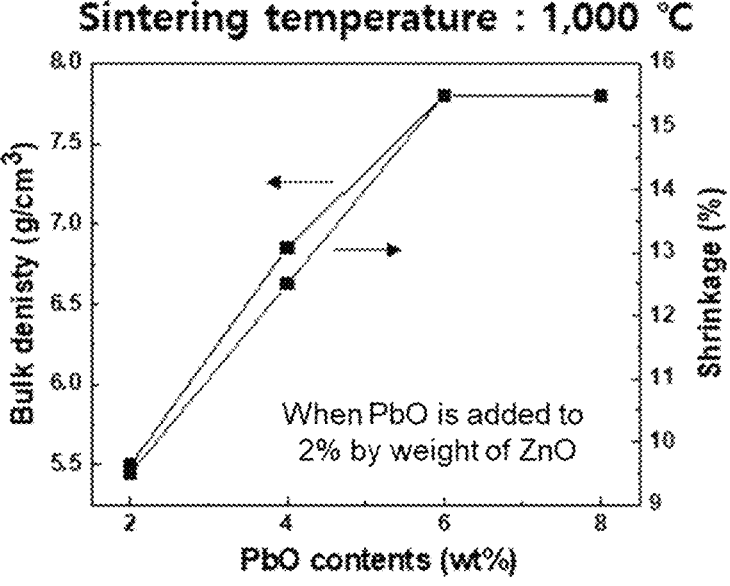
FIG. 4B shows the density and shrinkage depending on the PbO contents at a sintering temperature of 1,000° C.

FIG. 4A shows the density and shrinkage depending on the PbO contents at a sintering temperature of 950° C. FIG. 4B shows the density and shrinkage depending on the PbO contents at a sintering temperature of 1000° C.

Referring to FIGS. 4A and 4B, when PbO is added to 2% by weight of ZnO, sintering is possible at less than 1000° C. and the density achieves 7.5 g/cm³. Further, referring to FIG. 4A, e.g., when the content of PbO is 6% by weight to 8% by weight, the effect is the best in both of the density and shrinkage.

Experimental Example 4: Effect Depending on Sn Contents

Through Experimental Example 1 above, the effect when substituting Sn for Pb by adding Sn to PLZT was confirmed.

Accordingly, an experiment was performed to derive the molar ratio of Sn capable of obtaining high shrinkage, high density, high permittivity, and high breakdown voltage.

Figure 5A:
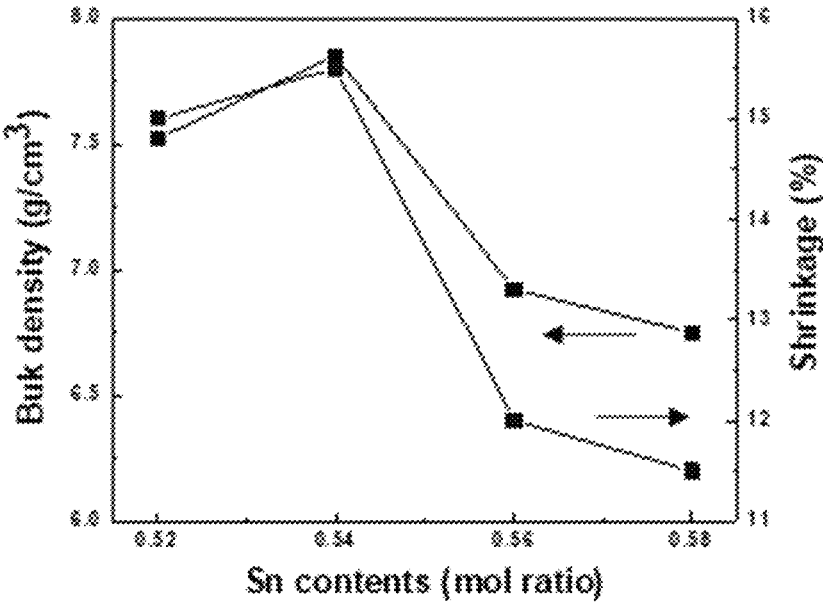
FIG. 5A shows the density and shrinkage depending on the Sn molar ratio (Y value) in the $Pb_{0.88}La_{0.12}([Zr_{1-y}Sn_y]_{0.86}Ti_{0.14})$ composition.
Figure 5B:
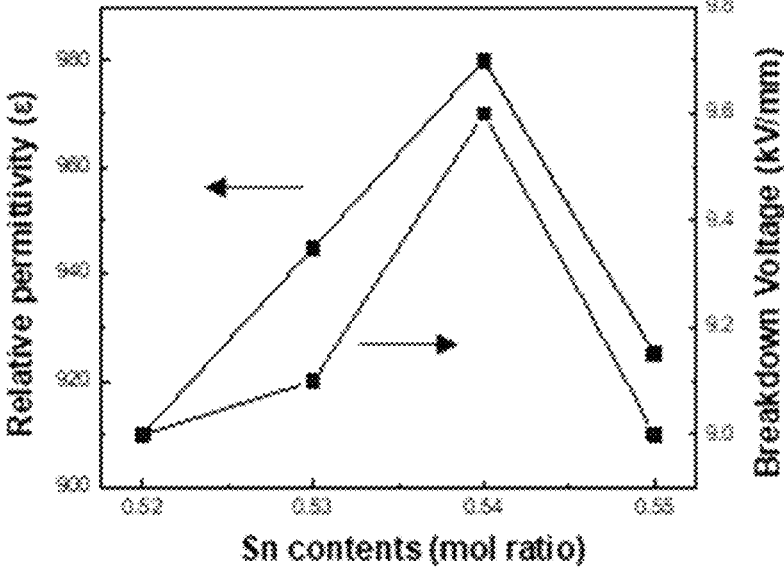
FIG. 5B shows the permittivity and breakdown voltage depending on the Sn molar ratio (Y value) in the $Pb_{0.88}La_{0.12}([Zr_{1-y}Sn_y]_{0.86}Ti_{0.14})$ composition.

FIG. 5A shows the density and shrinkage depending on the Sn molar ratio (Y value) in the $Pb_{0.88}La_{0.12}([Zr_{1-Y}Sn_Y]_{0.86}Ti_{0.14})$ composition. FIG. 5B shows the permittivity and breakdown voltage depending on the Sn molar ratio (Y value) in the $Pb_{0.88}La_{0.12}([Zr_{1-Y}Sn_Y]_{0.86}Ti_{0.14})$ composition.

Referring to FIGS. 5A and 5B, the shrinkage, density, permittivity, and breakdown voltage are the highest when the composition having the Y value of 0.54 is $Pb_{0.88}La_{0.12}([Zr_{0.46}Sn_{0.54}]_{0.86}Ti_{0.14})$.

Experimental Example 5: Effect Depending on (Zr, Sn) Contents

Through Experimental Example 4, when Y=0.54, the sintering temperature, density, shrinkage, and breakdown voltage targeted by the present disclosure were achieved. However, because a target permittivity of 1200 or higher could not be obtained, an experiment was performed to obtain a high permittivity compared to the existing one through changes in the relative contents thereof to Ti with Zr and Sn being as a bundle while maintaining Sn at 0.54.

Figure 6A:
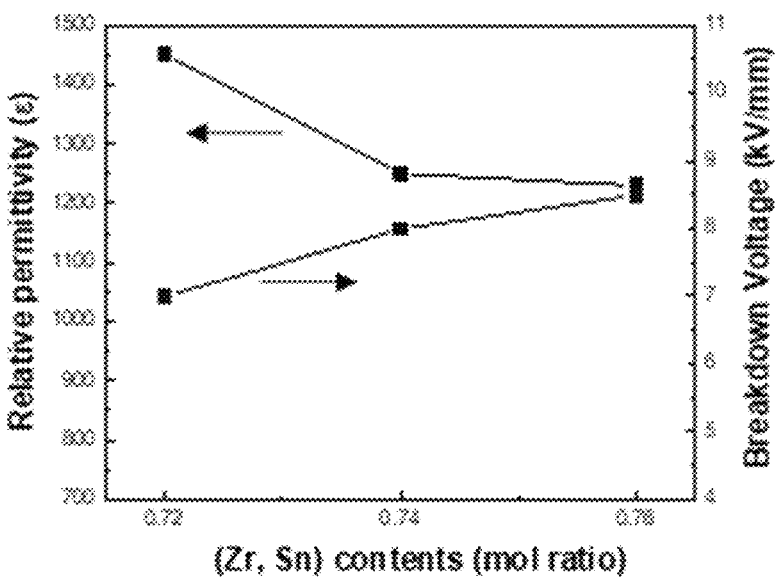
FIG. 6A shows the permittivity and breakdown voltage when the Z value in a $Pb_{0.88}La_{0.12}([Zr_{0.46}Sn_{0.54}]_ZTi_{1-Z})$ composition is less than 0.76.
Figure 6B:
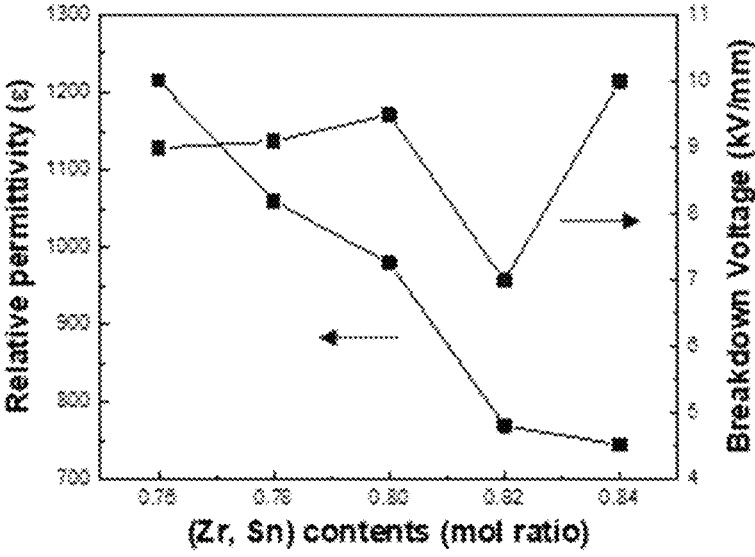
FIG. 6B shows the permittivity and breakdown voltage when the Z value in the $Pb_{0.88}La_{0.12}([Zr_{0.46}Sn_{0.54}]_ZTi_{1-Z})$ composition is greater than 0.76.

FIG. 6A shows the permittivity and breakdown voltage when the Z value in a $Pb_{0.88}La_{0.12}([Zr_{0.46}Sn_{0.54}]_Z Ti_{1-Z})$ composition is less than 0.76. FIG. 6B shows the permittivity and breakdown voltage when the Z value in the $Pb_{0.88}La_{0.12}([Zr_{0.46}Sn_{0.54}]_Z Ti_{1-Z})$ composition is greater than 0.76. FIG. 6C shows a density measurement result when the Z value in the $Pb_{0.88}La_{0.12}([Zr_{0.46}Sn_{0.54}]_Z Ti_{1-Z})$ composition is greater than 0.76.

Referring to FIGS. 6A-6C, when the composition (with Z=0.76) is $Pb_{0.88}La_{0.12}([Zr_{0.46}Sn_{0.54}]_{0.76}Ti_{0.24})$, a density of 7.8 $g/cm^3$ or more, a permittivity of 1200 or more, and a breakdown voltage of 9 kV/mm or more could be confirmed, and a low sintering temperature of 950° C. could be derived.

Therefore, the high permittivity antiferroelectric may provide an antiferroelectric having a $Pb_x La_{1-x}([Zr_{1-Y}Sn_Y]_Z Ti_{1-Z})$ composition that is sintered at a low temperature through appropriate mixing, wherein the antiferroelectric has a high density and a high permittivity.

Hereinabove, although the present disclosure has been described, those of ordinary skill in the art to which the present disclosure pertains are able to understand that the present disclosure may be embodied in other specific forms without changing the technical spirit or essential features thereof. Therefore, it should be understood that the embodiments described above are illustrative in all respects and not restrictive.

What is claimed is:

1. A method for manufacturing an antiferroelectric, the method comprising:
   preparing a precursor mixture by mixing dielectric precursors;
   calcining the precursor mixture;
   manufacturing a molded product by pressurizing a calcined resultant product; and
   sintering the molded product to obtain a sintered body,
   wherein the antiferroelectric comprises a $Pb_x La_{1-x}([Zr_{1-Y}Sn_Y]_Z Ti_{1-Z})$ composition,
   wherein X is in a range of 0.86 to 0.90, Y is in a range of 0.52 to 0.56, and Z is in a range of 0.74 to 0.78.

2. The method of claim 1, wherein the dielectric precursors comprise:
   50% by weight to 60% by weight of lead oxide (PbO);
   15% by weight to 30% by weight of zirconium oxide $(ZrO_2)$;
   1% by weight to 5% by weight of titanium oxide $(TiO_2)$;
   8% by weight to 14% by weight of lanthanum oxide $(La_2O_5)$; and
   1% by weight to 16% by weight of tin oxide $(SnO_2)$.

3. The method of claim 1, wherein the molded product is sintered with a sintering agent to obtain the sintered body, and
   wherein the sintering agent comprises 1% by weight to 4% by weight of zinc oxide (ZnO) and 1% by weight to 10% by weight of lead oxide (PbO), based on a total amount of the antiferroelectric.

4. The method of claim 1, wherein the antiferroelectric has a density in a range of 7.5 $g/cm^3$ to 8.0 $g/cm^3$.

5. The method of claim 1, wherein the antiferroelectric has a permittivity (ε) in a range of 1100 to 1300.

6. The method of claim 1, wherein the antiferroelectric has a breakdown voltage in a range of 8 kV/mm to 10 kV/mm.

7. The method of claim 1, wherein the antiferroelectric has a sintering temperature in a range of 900° C. to 1,100° C.

* * * * *